United States Patent
Mohamed

(10) Patent No.: US 9,545,875 B2
(45) Date of Patent: Jan. 17, 2017

(54) METHOD FOR CONTROLLING A LIGHT EMISSION OF A HEADLIGHT OF A VEHICLE

(75) Inventor: Manoj Mohamed, Kerala (IN)

(73) Assignee: Robert Bosch GmbH, Stuttgart (DE)

( * ) Notice: Subject to any disclaimer, the term of this patent is extended or adjusted under 35 U.S.C. 154(b) by 332 days.

(21) Appl. No.: 13/587,712

(22) Filed: Aug. 16, 2012

(65) Prior Publication Data

US 2013/0054087 A1   Feb. 28, 2013

(30) Foreign Application Priority Data

Aug. 23, 2011   (DE) .................. 10 2011 081 360

(51) Int. Cl.
  *B60Q 1/18*   (2006.01)
  *B60Q 1/08*   (2006.01)
  *B60Q 1/52*   (2006.01)

(52) U.S. Cl.
  CPC .............. *B60Q 1/18* (2013.01); *B60Q 1/085* (2013.01); *B60Q 1/525* (2013.01); *B60Q 2300/336* (2013.01); *B60Q 2300/45* (2013.01)

(58) Field of Classification Search
  CPC ............ B60Q 1/085; B60Q 1/18; B60Q 1/525
  See application file for complete search history.

(56) References Cited

U.S. PATENT DOCUMENTS

| | | | |
|---|---|---|---|
| 2004/0114381 A1* | 6/2004 | Salmeen ............... | B60Q 1/085 362/465 |
| 2010/0188864 A1 | 7/2010 | Raghunathan et al. | |
| 2010/0328644 A1* | 12/2010 | Lu et al. ................. | 356/5.01 |

FOREIGN PATENT DOCUMENTS

| | | |
|---|---|---|
| DE | 10060734 A1 | 6/2002 |
| DE | 10 2008 008 884 | 8/2009 |
| DE | 10 2008 025 947 | 12/2009 |
| DE | 10 2009 035 327 | 4/2010 |
| DE | 10 2008 057 375 | 5/2010 |
| DE | 10 2009 051 485 | 6/2010 |
| DE | 102009009472 A1 | 8/2010 |
| DE | 102009020910 A1 | 11/2010 |
| EP | 1506893 A2 | 2/2005 |
| GB | 2395390 A | 5/2004 |
| JP | 2009120147 A | 6/2009 |
| JP | 2009132230 A | 6/2009 |
| JP | 2011084106 A | 4/2011 |
| JP | 2011207348 A | 10/2011 |
| WO | 2013026608 A1 | 2/2013 |

* cited by examiner

*Primary Examiner* — Basil T Jos
(74) *Attorney, Agent, or Firm* — Norton Rose Fulbright US LLP; Gerard Messina

(57) ABSTRACT

A method for controlling a light emission of at least one headlight of a host vehicle includes: reading in a side collision warning signal which represents a risk for the host vehicle of a side impact from another vehicle; generating an activation signal using the side collision warning signal and a position information which represents a position of the other vehicle relative to the host vehicle; and controlling the light emission of the at least one headlight based on the activation signal, in order to illuminate the other vehicle with the aid of the at least one headlight.

15 Claims, 2 Drawing Sheets

METHOD FOR CONTROLLING A LIGHT EMISSION OF A HEADLIGHT OF A VEHICLE

BACKGROUND OF THE INVENTION

1. Field of the Invention

The present invention relates to a device and a method for controlling a light emission of a headlight of a vehicle, as well as a computer program product having program code for carrying out such a method when the program is executed.

2. Description of the Related Art

Side collision warning (SCW) is a function which is able to detect traffic, approaching from the side, which could possibly result in a side impact, and to warn the driver so that countermeasures may be taken.

Published German patent application document DE 10 2008 008 884 A1 discloses a vehicle lighting system having a detection device for detecting a solid angle in which a motorist is present, having a lighting device for emitting signal light having a spectral distribution as a function of the solid angle and/or an intensity as a function of the solid angle, having a signaling control element, and having a control device which is coupled to the detection device, the lighting device and the signaling control element which are configured in such a way that the intensity as a function of the solid angle and/or the spectral distribution, as a function of the solid angle, of the emitted light is varied as a response to activating the signaling control element and detecting a solid angle in which a motorist is present.

BRIEF SUMMARY OF THE INVENTION

The present invention provides a method for controlling a light emission of a headlight of a vehicle, a device which is designed to carry out the steps of such a method, and a computer program product having program code for carrying out such a method when the program is executed on such a device.

The present invention provides a method for controlling a light emission of at least one headlight of a vehicle, the method having the following steps:

reading in a side collision warning signal, the side collision warning signal representing a risk for the vehicle of a side impact from another vehicle;

generating an activation signal using the side collision warning signal and position information, the position information representing a position of the other vehicle relative to the vehicle; and controlling the light emission of the at least one headlight, based on the activation signal, in order to illuminate the other vehicle with the aid of the at least one headlight.

The vehicle may be a motor vehicle, in particular an on-road motor vehicle, for example a passenger car, a truck, a passenger carrying vehicle, or a utility vehicle. The at least one headlight may be, for example, a front headlight of the vehicle. The light emission of the headlight may be changeable in stages, or infinitely variable. The light emission of the headlight may be changed with regard to the emission characteristic of the headlight. The emission characteristic may relate to a brightness level, a light angle, a width or size of the roadway area ahead of the vehicle to be illuminated, a light height, an illumination pattern, switching on or off of lighting means, or the like which characterize a light emission by the headlights. The side collision warning signal may be read in when there is a risk for the vehicle of a side impact from another vehicle. Alternatively or additionally, the side collision warning signal may have a first logical value when there is a risk for the vehicle of a side impact from another vehicle, and the side collision warning signal may have a second logical value when there is no risk for the vehicle of a side impact from another vehicle. In that case, for example, the activation signal may be generated and the light emission may thus be controlled if the side collision warning signal has the first logical value, i.e., there is a risk for the vehicle of a side impact from another vehicle. The position information may be contained, for example, in the side collision warning signal or in a position signal of a position detection device.

Moreover, the present invention provides a device which is designed to carry out or implement the steps of the method according to the present invention. In particular, the device may have units which are designed to carry out the steps of the method. In addition, as a result of this design variant of the present invention in the form of a device, the object of the present invention may be achieved quickly and efficiently.

In the present context, a device may be understood to mean an electrical device or control unit which processes sensor signals and outputs control signals as a function of same. The device may have an interface which may be provided by hardware and/or software. In a hardware design, the interfaces may be, for example, part of a so-called system ASIC which contains various functions of the device. However, it is also possible for the interfaces to be dedicated, integrated circuits or to be composed, at least partially, of discrete components. In a software design, the interfaces may be software modules which are present in addition to other software modules on a microcontroller, for example.

Also advantageous is a computer program product having program code which is stored on a machine-readable carrier such as a semiconductor memory, a hard drive memory, or an optical memory and used for carrying out the method according to one of the above-described specific embodiments when the program is executed on a device.

The present invention is based on the finding that a control of a light emission of at least one headlight of a vehicle, for example also an adaptation of intelligent vehicle lighting systems, may advantageously be carried out on the basis of a side collision warning signal. A response may thus be made to a side collision warning by adapting the illumination or light emission, for example. Thus, for example, a side collision warning (SCW) may be linked in particular to an intelligent headlight control (IHC). The present invention represents an improvement of the SCW function by providing a linkage to IHC, for example.

One advantage of the present invention is that a driver is provided with better illumination of the vehicle with which a collision is imminent, and thus, with the earliest possible and most optimal view of a hazard situation. Additionally or alternatively, a driver of the other vehicle potentially involved in the side impact is warned of the hazard by the light emission of the vehicle. Traffic safety may be increased, and a risk of accident may be reduced, in this way. In addition, controlling the light emission using the side collision warning signal represents a cost-effective and space-saving approach, since input variables and devices which are already present may be used, at least in part.

According to one specific embodiment, the side collision warning signal may be received from an optical detection device and/or a radar detection device during the reading-in step. The optical detection device may be a vehicle camera, for example a video camera or a still camera. The optical detection device may be connected to an image processing electronics system, for example in the form of a suitable pattern recognition or object recognition, or a suitable recognition algorithm, or may have an image processing electronics system. The optical detection device may generate image data which may be analyzed to recognize a risk of a side impact from another vehicle. The radar detection device may be designed to generate information concerning a movement of another vehicle or a risk of a side impact from another vehicle. Such a specific embodiment offers the advantage that a risk of a side impact may thus be reliably recognized. In addition, devices already installed in the vehicle may be used, thus allowing space and cost requirements to be kept low.

In addition, the light emission of the at least one headlight may be directed toward the other vehicle during the control step. Additionally or alternatively, the light emission of the at least one headlight may be activated during the control step. In particular, an emission characteristic of the light emission of the at least one headlight may be changed so that the other vehicle is illuminated by light of the at least one headlight. If the at least one headlight is not active, i.e., switched off, at a point in time when the side collision warning signal is read in, the at least one headlight may be activated, i.e., switched on, during the control step. The activation signal may thus also include information or an instruction for the light emission of the at least one headlight to be activated during the control step if it is not active. Such a specific embodiment offers the advantage, on the one hand, that the light emission may be precisely and reliably controlled in order to illuminate the other vehicle, and on the other hand, attention may be drawn to the other vehicle as a potential source of an accident by activating and directing the light emission, even if the headlight is initially switched off.

A light emission of at least one front headlight of the vehicle and/or a light emission of a side collision warning headlight of the vehicle may be controlled during the control step. Thus, the at least one headlight may be a front headlight, and additionally or alternatively may be a special side collision warning headlight. The side collision warning headlight may be situated apart from a front headlight unit, or may be integrated into same. The side collision warning headlight is designed to illuminate another vehicle which represents a risk of causing a side impact. For this purpose, the light emission of the side collision warning headlight may be activated and directed toward the other vehicle. For example, either the light emission of the side collision warning headlight and the light emission of the at least one front headlight, or one of the two light emissions, may be controlled. Such a specific embodiment offers the advantage that, depending on the structural prerequisites of the vehicle, at least one headlight of the vehicle which is already present, and additionally or alternatively, a headlight which is provided for the side collision warning, may be used to warn of the risk. Thus, even more effective warning of the risk of a side impact may be provided with the aid of at least one front headlight and the additional headlight, or with the aid of the additional headlight, whereby it is not necessary to change the light emission of the at least one front headlight at night, for example. The hazard warning may thus be made in a more effective and flexible manner.

Furthermore, a step of determining the position information based on image data and/or radar data may be provided. During the generation step, the side collision warning signal and the determined position information may be used to generate the activation signal. The position information may be computed from the image data and/or radar data, using a suitable evaluation electronics system or a suitable evaluation algorithm. Such a determination of the position information offers the advantage that the computed or determined position information may precisely and reliably represent the position of the other vehicle relative to the vehicle. In addition, there is the option of continuously updating the position by repeatedly carrying out the determination step. The light emission of the at least one headlight may thus be precisely and reliably controlled based on the activation signal.

In addition, a step of emitting light with the aid of the at least one headlight in response to the control step may be provided. The emission step may be carried out with the aid of a headlight unit or headlight module. The light of the at least one headlight may thus be emitted based on the activation signal. Such an emission of the light offers the advantage that the other vehicle may be identified as a potential hazard source.

Furthermore, a step of verifying whether the other vehicle is illuminated with the aid of the at least one headlight, using an optical detection device, may be provided. In other words, the verification step may represent a camera-based check as to whether the other vehicle is correctly illuminated with the aid of the at least one headlight. If it is determined in the verification step that the other vehicle is not being correctly illuminated with the aid of the at least one headlight, the position information may be redetermined, the activation signal generated again, and/or the light emission controlled again in order to correctly illuminate the other vehicle with the aid of the at least one headlight. Such a verification offers the advantage that a possibly incorrect headlight control may be recognized and corrected. Traffic safety is thus increased, since even more reliable warning of the risk of a side impact may be provided.

DETAILED DESCRIPTION OF THE INVENTION

Figure 1:
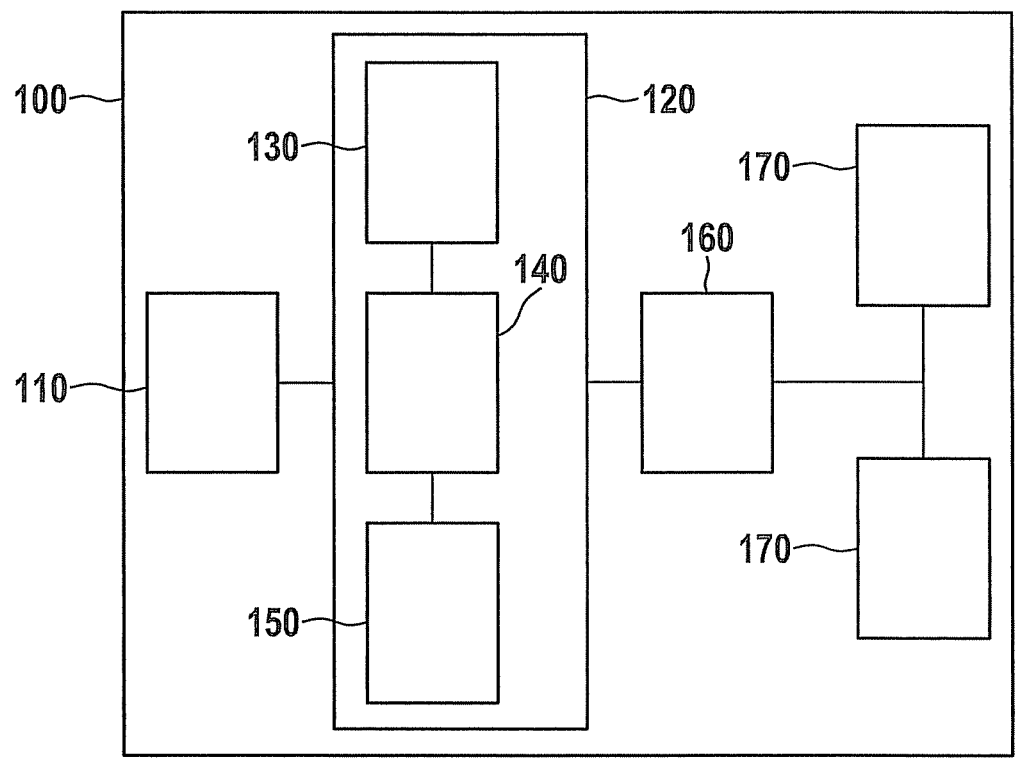
FIG. 1 shows a schematic illustration of a vehicle having a control device according to one exemplary embodiment of the present invention.

Identical or similar elements may be denoted by identical or similar reference numerals in the figures, and therefore the description is not repeated. In addition, the figures of the drawings, the description thereof, and the claims contain numerous features in combination. It is clear to those skilled in the art that these features may also be considered individually, or combined to form further combinations not explicitly described herein. Furthermore, the present invention is explained in the following description using various measurements and dimensions; the present invention is not to be construed as being limited to these measurements and dimensions. Moreover, method steps according to the present invention may be carried out repeatedly, as well as in a sequence other than that described. An exemplary embodiment which includes an "and/or" conjunction between a first feature/step and a second feature/step may be construed in such a way that according to one specific embodiment, the exemplary embodiment includes the first feature/first step as well as the second feature/second step, and according to another specific embodiment includes only the first feature/step or only the second feature/step.

FIG. 1 shows a schematic illustration of a vehicle having a control device according to one exemplary embodiment of the present invention. Vehicle 100 has a vehicle camera 110, a control device 120 having a reader 130, a generation device 140, and an activating device 150, a headlight control unit 160, and two headlights 170. Vehicle camera 110 is connected to control device 120 via a communication interface, for example at least one signal line or the like. Headlight control unit 160 is connected to control device 120 via a further communication interface, for example at least one signal line or the like. Control device 120 is thus connected between vehicle camera 110 and headlight control unit 160. Headlights 170 are connected to headlight control unit 160 via a further communication interface, for example at least one signal line or the like. Headlight control unit 160 is thus connected between control device 120 and headlights 170. Although not illustrated in this way in FIG. 1, control unit 160 may also be part of control device 120, or control device 120 may be a part of headlight control unit 160.

Vehicle camera 110 may have an image processing electronics system, for example for suitable methods for image processing, image analysis, pattern recognition, object recognition, and/or a signal processing electronics system, etc., or may be connected to same. According to the exemplary embodiment shown in FIG. 1, vehicle camera 110 is designed to generate a side collision warning signal, the side collision warning signal representing a risk for vehicle 100 of a side impact from another vehicle. Various logical values of the side collision warning signal may represent a presence or absence of a risk for vehicle 100 of a side impact from another vehicle. Vehicle camera 110 is designed to output the side collision warning signal to control device 120.

Control device 120 has reader 130, generation device 140, and activating device 150. Control device 120 may be designed to receive the side collision warning signal from vehicle camera 110. Control device 120 is designed to bring about or carry out a control of a light emission of headlights 170 of vehicle 100.

Reader 130 is designed to read in the side collision warning signal. If the side collision warning signal has a logical value which represents a presence of a risk for vehicle 100 of a side impact from another vehicle, reader 130 may be designed to output or relay the side collision warning signal to generation device 140.

Generation device 140 is designed to receive the side collision warning signal from reader 130. Generation device 140 is designed to generate an activation signal using the side collision warning signal and position information, the position information representing a position of the other vehicle relative to the vehicle. For this purpose, generation device 140 or a device associated with same may optionally determine the position information. Generation device 140 is designed to output the activation signal to activating device 150.

Activating device 150 is designed to receive the activation signal from generation device 140. Activating device 150 is designed to control the light emission of the at least one headlight, based on the activation signal, in order to illuminate the other vehicle with the aid of the at least one headlight. Activating device 150 may be designed to generate control information which represents the control and which may be used to carry out the control of the light emission. Activating device 150 is designed to output the control information to headlight control unit 160.

Headlight control unit 160 is designed to receive the control information from control device 120 or from activating device 150 of control device 120. Headlight control unit 160 is also designed to generate a control signal for controlling headlights 170. Headlight control unit 160 may take into account or use the control information for controlling the light emission of headlights 170 in generating the control signal. The control signal may thus contain the control information which is generated based on the activation signal in control device 120. Headlight control unit 160 is designed to output the control signal to headlights 170.

Headlights 170 may receive the activation signal from headlight control unit 160. The control information in the control signal which is based on the activation signal may bring about control of the light emission of headlights 170 in order to warn of an imminent side impact.

Figure 2:
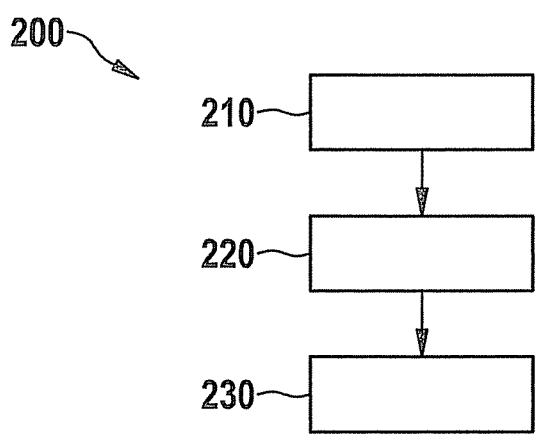
FIG. 2 shows a flow chart of a method according to one exemplary embodiment of the present invention.

FIG. 2 shows a flow chart of a method 200 for controlling a light emission of at least one headlight of a vehicle according to one exemplary embodiment of the present invention. Method 200 has a step of reading in 210 a side collision warning signal. The side collision warning signal represents a risk for the vehicle of a side impact from another vehicle. Method 200 also has a step of generating 220 an activation signal, using the side collision warning signal and a piece of position information. The position information represents a position of the other vehicle relative to the vehicle. Method 200 also has a step of controlling 230 the light emission of the at least one headlight, based on the activation signal, in order to illuminate the other vehicle with the aid of the at least one headlight. Method 200 may advantageously be carried out in combination with a device such as the control device from FIG. 1, for example. Thus, the control device, or the units of the control device, from FIG. 1 may be designed to carry out the steps of method 200.

Figure 3:
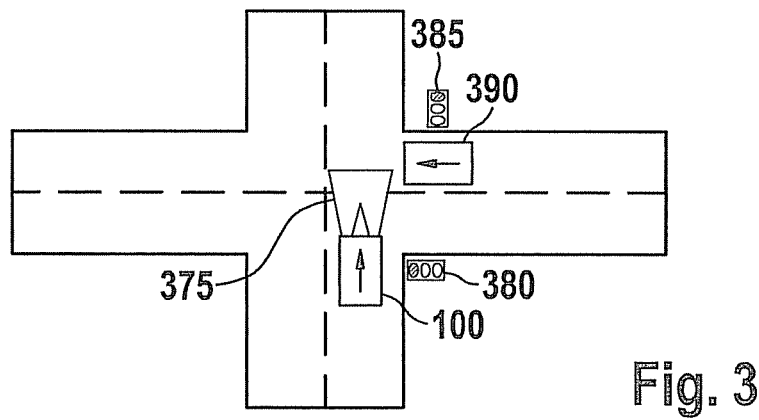
FIGS. 3 to 5 show schematic illustrations of traffic situations having a risk of a side impact between a vehicle and another vehicle.

FIG. 3 shows a schematic illustration of a traffic situation with a risk of a side impact between a vehicle and another vehicle. In particular, an intersection is shown which involves a traffic situation which a normal side collision warning function may interpret as a risk of a side impact. A vehicle 100, a light cone 375, a first traffic light 380, a second traffic light 385, and another vehicle 390 are shown. A first roadway and a second roadway intersect in the area of the intersection. Vehicle 100 is present on the first roadway in the intersection area, in the vicinity of first traffic light 380. Other vehicle 390 is present on the second roadway in the intersection area, in the vicinity of second traffic light 385. To illustrate a driving direction of vehicle 100, a direction arrow is shown for vehicle 100, and to illustrate a driving direction of vehicle 390, another direction arrow is shown for other vehicle 390. The direction arrows indicate that the driving directions of vehicle 100 and of other vehicle 390 cross one another in the intersection area. It is thus apparent that vehicle 100 and other vehicle 390 are moving toward one another at approximately a right angle. Thus, for vehicle 100 there is a risk of a side impact from other vehicle 390.

Vehicle 100 may also be referred to as the reference vehicle. Light cone 375 is generated by two front headlights of vehicle 100. Specifically, light cone 375 is generated by a light emission from two front headlights of vehicle 100. Light cone 375 may, for example, correspond to a low beam or be similar thereto. Traffic light 380 to which vehicle 100 is near may be green. Thus, traveling through the intersection is allowed for vehicle 100 at that moment.

Second traffic light 385 to which other vehicle 390 is near may be red. Thus, traveling through the intersection is not allowed for other vehicle 390 at that moment. However, other vehicle 390 is already partly between second traffic light 385 and an intersection point of the two roadways in the intersection center. For example, a driver of other vehicle 390 may have failed to notice that second traffic light 385 is red. Thus, other vehicle 390 is a vehicle which represents a possible risk of an accident.

A conventional side collision warning system may now output a warning to the driver of vehicle 100 with regard to a possible side impact. However, if vehicle 100 is the vehicle from FIG. 1, based on the traffic situation shown in FIG. 3 a method for controlling the light emission according to FIG. 2 may be carried out, and, for example, a side collision warning signal may be read in.

Figure 4:
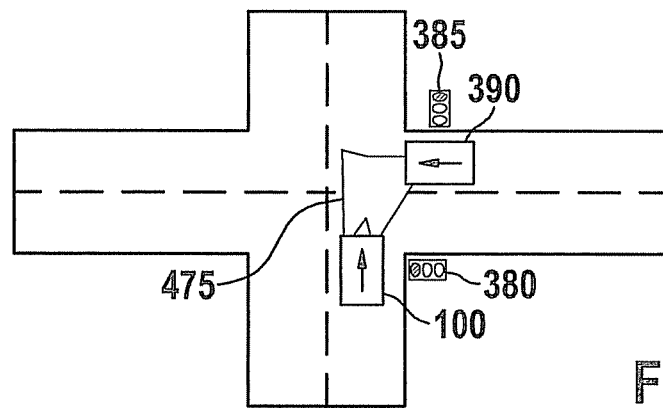

FIG. 4 shows a schematic illustration of a traffic situation with a risk of a side impact between a vehicle and another vehicle. The illustration in FIG. 4 corresponds to the illustration in FIG. 3, except that a modified light cone 475 of vehicle 100 is shown in FIG. 4. Vehicle 100 is the vehicle from FIG. 1. Modified light cone 475 results from application of the method from FIG. 2 to the light emission of vehicle 100. The light emission of vehicle 100 is controlled in such a way that modified light cone 475 is swiveled toward other vehicle 390, and other vehicle 390 is at least partially illuminated by the light emission of vehicle 100. This results in a side collision warning with illumination of other vehicle 390, for example using an intelligent light control system such as IHC. The illumination of other vehicle 390 or the potential participant in the accident may thus represent a warning to the driver of vehicle 100 that a side impact involving other vehicle 390 is possible.

Figure 5:
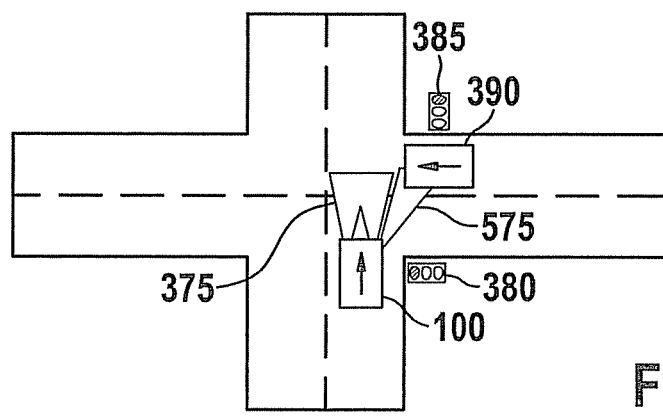

FIG. 5 shows a schematic illustration of a traffic situation with a risk of a side impact between a vehicle and another vehicle. The illustration in FIG. 5 corresponds to the illustration in FIG. 3, except that an additional light cone 575 is shown. Vehicle 100 is the vehicle from FIG. 1. Additional light cone 575 may be generated by the light emission of a side collision warning headlight. Thus, compared to the vehicle from FIG. 1, vehicle 100 additionally has the side collision warning headlight. The side collision warning headlight may have one or multiple warning lights. Additional light cone 575 results from application of the method from FIG. 2 to the light emission of vehicle 100. The light emission of vehicle 100 is controlled in such a way that additional light cone 575 is directed toward other vehicle 390, and other vehicle 390 is at least partially illuminated by the light emission of vehicle 100. This results in a side collision warning for the driver of vehicle 100 with illumination of other vehicle 390 or the potential participant in the accident, using the side collision warning headlight or special warning lights.

Various exemplary embodiments of the present invention are summarized below with reference to FIGS. 1 through 5. The sequence of the side collision warning function, with illumination according to method 200 according to the exemplary embodiment illustrated in FIG. 2 and using control device 120 from FIG. 1, proceeds as follows. If a possible side impact is detected at night, for example, the intelligent headlight control system directs headlight cone 475 in response to carrying out method 200 and based on the activation signal generated in control device 120 in such a way that the other vehicle is illuminated. This may optionally be carried out using a lateral swivel control function of front headlight 170. Alternatively or additionally, a different emission characteristic of front headlight 170 may be changed by controlling the light emission. During the day, in the event of a possible side impact, for example, the intelligent headlight control system switches on front headlights 170 in response to carrying out method 200 and based on the activation signal which is generated in control device 120, and directs headlight cone 475 onto other vehicle 390 as a warning to its driver.

A sequence of the side collision warning function with illumination according to one exemplary embodiment of the present invention may thus proceed as follows. For the side collision warning function, a possible side impact is initially detected. A relative position of the target vehicle, i.e., other vehicle 390, with respect to the reference vehicle, i.e., vehicle 100, is subsequently computed. The relative position of the target vehicle, i.e., other vehicle 390, together with a signal which indicates that a side collision warning function is active is transmitted to the unit of the intelligent headlight control system. The unit of the intelligent headlight control system then adjusts the light cone in such a way that the vehicle which represents a possible risk of an accident is illuminated. The light cone may be laterally expanded. The front headlights may also be switched on if they are still switched off.

According to another exemplary embodiment of the present invention, special side collision warning headlights may be provided which may be mounted together with side collision warning cameras, for example. These side collision warning headlights may be switched on in order to illuminate other vehicle 390, approaching from the side, in the event of a risk of an accident. In this case, the light emission of front headlights 170 of vehicle 100 does not necessarily have to be changed. However, this may be provided according to another exemplary embodiment.

Thus, an improvement results compared to a side collision warning function which is not coupled to an intelligent light control system. For the reference vehicle, better illumination of the other vehicle with which a collision is imminent is achieved. For another vehicle, better visibility of the reference vehicle in the event of risk of an accident is achieved.

What is claimed is:

1. A method for controlling a light emission of at least one headlight of a host vehicle, comprising:
   receiving a side collision warning signal representing a risk for the host vehicle of a side impact from another vehicle;
   generating an activation signal using the side collision warning signal and a position information representing a position of the other vehicle relative to the host vehicle; and
   controlling the light emission of the at least one headlight based on the activation signal, in order to illuminate the other vehicle with the aid of the at least one headlight, the controlling including changing an emission characteristic of the at least one headlight.

2. The method as recited in claim 1, wherein the side collision warning signal is received from at least one of an optical detection device and a radar detection device.

3. The method as recited in claim 1, wherein the controlling of the light emission of the at least one headlight includes at least one of (i) directing the light emission toward the other vehicle, and (ii) activating the light emission of the at least one headlight.

4. The method as recited in claim 3, wherein the position information representing the position of the other vehicle relative to the host vehicle is determined based on at least one of image data and radar data.

5. The method as recited in claim 3, wherein the light emission of the at least one headlight is directed toward the other vehicle.

6. The method as recited in claim 3, further comprising:
verifying, using an optical detection device, whether the other vehicle is illuminated with the aid of the at least one headlight of the host vehicle.

7. The method as recited in claim 6, wherein if the verifying indicates that the other vehicle is incorrectly illuminated, the method further comprises redetermining the position information of the other vehicle and controlling the at least one headlight based on the redetermined position.

8. The method as recited in claim 1, wherein the at least one headlight of the host vehicle includes at least one of a front headlight and a side collision warning headlight, and the controlling of the light emission of the at least one headlight includes controlling at least one of a light emission of the front headlight and a light emission of the side collision warning headlight.

9. The method as recited in claim 1, wherein the emission characteristic includes at least one of a light pattern, a brightness level, and a light height of the at least one headlight.

10. A control system for controlling a light emission of at least one headlight of a host vehicle, comprising:
a receiver unit for receiving a side collision warning signal representing a risk for the host vehicle of a side impact from another vehicle;
an activation-signal generator for generating an activation signal using the side collision warning signal and a position information representing a position of the other vehicle relative to the host vehicle; and
a controller for controlling the light emission of the at least one headlight based on the activation signal, in order to illuminate the other vehicle with the aid of the at least one headlight, the controller changing an emission characteristic of the at least one headlight.

11. The control system as recited in claim 10, wherein the emission characteristic includes at least one of a light pattern, a brightness level, and a light height of the at least one headlight.

12. The control system as recited in claim 10, wherein the controller verifies, using an optical detection device, whether the other vehicle is illuminated with the aid of the at least one headlight of the host vehicle, and wherein if the verifying indicates that the other vehicle is incorrectly illuminated, the controller redetermines the position information of the other vehicle and controls the at least one headlight based on the redetermined position.

13. A non-transitory computer-readable data storage medium storing a computer program having program codes which, when executed on a computer, implements a method for controlling a light emission of at least one headlight of a host vehicle, the method comprising:
receiving a side collision warning signal representing a risk for the host vehicle of a side impact from another vehicle;
generating an activation signal using the side collision warning signal and a position information representing a position of the other vehicle relative to the host vehicle; and
controlling the light emission of the at least one headlight based on the activation signal, in order to illuminate the other vehicle with the aid of the at least one headlight, the controlling including changing an emission characteristic of the at least one headlight.

14. The non-transitory computer-readable data storage medium as recited in claim 13, wherein the emission characteristic includes at least one of a light pattern, a brightness level, and a light height of the at least one headlight.

15. The non-transitory computer-readable data storage medium as recited in claim 13, wherein the method further comprises:
verifying, using an optical detection device, whether the other vehicle is illuminated with the aid of the at least one headlight of the host vehicle, wherein if the verifying indicates that the other vehicle is incorrectly illuminated, the method further comprises redetermining the position information of the other vehicle and controlling the at least one headlight based on the redetermined position.

* * * * *